(12) United States Patent
Uchida et al.

(10) Patent No.: US 7,071,896 B2
(45) Date of Patent: *Jul. 4, 2006

(54) BI-DIRECTIONAL COMMUNICATION SYSTEM, DISPLAY APPARATUS, BASE APPARATUS AND BI-DIRECTIONAL COMMUNICATION METHOD

(75) Inventors: Mami Uchida, Saitama (JP); Ayumi Mizobuchi, Tokyo (JP); Kasumi Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/108,241

(22) Filed: Apr. 18, 2005

(65) Prior Publication Data

US 2005/0188417 A1 Aug. 25, 2005

Related U.S. Application Data

(63) Continuation of application No. 09/906,922, filed on Jul. 16, 2001, now Pat. No. 6,930,661.

(30) Foreign Application Priority Data

Jul. 17, 2000 (JP) ............................. 2000-215359

(51) Int. Cl.
*G09G 5/00* (2006.01)
(52) U.S. Cl. .................. 345/2.3; 345/3.1; 455/3.05
(58) Field of Classification Search ........ 345/173–176, 345/156, 2.2, 2.3, 2.1, 3.1; 725/38, 135, 725/65, 64; 348/734, 555; 455/3.05, 3.06
See application file for complete search history.

(56) References Cited

U.S. PATENT DOCUMENTS

| 5,410,326 A | 4/1995 | Goldstein |
| 5,896,131 A | 4/1999 | Alexander |

(Continued)

FOREIGN PATENT DOCUMENTS

| EP | 0 838 945 | 4/1998 |

(Continued)

*Primary Examiner*—Richard Hjerpe
*Assistant Examiner*—Abbas Abdulselam
(74) *Attorney, Agent, or Firm*—Frommer Lawrence & Haug LLP; William S. Frommer

(57) ABSTRACT

A bi-directional communication system comprising a base apparatus and a display apparatus. The display apparatus is a portable liquid crystal display for viewing video programs and browsing the internet. The base apparatus contains a television tuner for receiving broadcast signals and wirelessly transmits programming to the display apparatus. An infrared remote control device connected to the base apparatus is used to control various external input devices (e.g., a VCR or DVD player). Control menus for the base apparatus and the external input device can be displayed on the display apparatus. The display apparatus contains a touch screen, so that a user can select operational commands for controlling the base apparatus and external input devices. The display apparatus wirelessly transmits selected operational commands to the base apparatus, which then retransmits the commands to the appropriate external input device using the infrared remote control device.

1 Claim, 9 Drawing Sheets

U.S. PATENT DOCUMENTS

| | | |
|---|---|---|
| 5,933,141 A | 8/1999 | Smith |
| 5,949,432 A | 9/1999 | Gough et al. |
| 6,040,829 A * | 3/2000 | Croy et al. ................ 715/864 |
| 6,097,441 A | 8/2000 | Allport |
| 6,263,503 B1 | 7/2001 | Margulis |
| 6,396,523 B1 | 5/2002 | Segal et al. |
| 6,417,869 B1 | 7/2002 | Do |
| 6,469,633 B1 | 10/2002 | Wachter |
| 6,507,592 B1 * | 1/2003 | Hurvig et al. .............. 370/503 |
| 6,670,970 B1 | 12/2003 | Bonura et al. |

FOREIGN PATENT DOCUMENTS

WO    WO 99 34599    7/1999

* cited by examiner

BI-DIRECTIONAL COMMUNICATION SYSTEM, DISPLAY APPARATUS, BASE APPARATUS AND BI-DIRECTIONAL COMMUNICATION METHOD

This is a continuation of application Ser. No. 09/906,922 filed Jul. 16, 2001, now U.S. Pat. No. 6,930,661, the entirety of which is incorporated herein by reference.

BACKGROUND OF THE INVENTION

The present invention relates generally to a bi-directional communication system having a base apparatus and a display apparatus, such as a television receiver.

A remote control (remote commander) is commonly used to adjust the volume, change the channel, adjust picture quality, or set a timer on a television receiver. Operation of the remote control commonly provides for menus to be displayed on the television screen. These menus display certain operations which can be selected and executed via the remote control. Thus, the remote control allows the user to perform various viewing related operations in accordance with the information displayed in the menus.

Similarly, set-top boxes (STBs) or integrated receiver decoders (IRDs) for receiving satellite broadcasting signals can also be operated by remote control. In addition to the menus commonly found in televisions, STBs generally display an electronic program guide (EPG) on the television screen. Using the remote control, a viewer can select desired programs from those shown in the EPG. In this manner, a television or a set-top box which receives a television broadcast signal is designed to utilize a combination of information displays (i.e. menus) operated by a remote control to select and execute various viewing operations.

However, this process of selecting operations from a displayed menu using a remote control, requires the appropriate information be displayed. Further, this process sometimes requires a complicated series of steps using the remote control. For example, some operations require the user to navigate a complex hierarchy of menus before finding the desired operation, or an operation may require certain inputs that are not conveniently performed using a remote control (e.g., cursor movement or text input).

SUMMARY OF THE INVENTION

Recent advancements in liquid crystal displays (LCDs) now allow for the production of lighter and smaller television displays. Handheld television monitors can now be practically manufactured. A remote control is no longer necessary if the entire device can be conveniently carried. For such devices, the use of a remote control may actually complicate use of the device.

It is therefore an object of the present invention to provide a bi-directional communication system having a display apparatus and a base apparatus which allows for remotely controlled operation and can readily be used to form a household network.

Other objects and advantages of the invention will in part be obvious and will in part be apparent from the specification and the drawings.

The preferred embodiment of the invention provides a bi-directional communication system having a display apparatus and a base apparatus. The display apparatus has an information signal receiver for wirelessly receiving an information signal. A display screen on the display apparatus displays a video corresponding to the received information signal. The display screen is preferably a liquid crystal display. An operation display—comprising a plurality of display items corresponding to user selectable operations—is displayed on the display screen. Preferably, the operation display is translucent and is superimposed on the display screen. A touch screen is provided on the display screen for detecting a location at which the user touches the display screen. An operation signal is then generated corresponding to the item displayed at the position touched on the display screen. An operation signal transmitter wirelessly transmits the generated operation signal to the base apparatus. The base apparatus has an information signal transmitter for wirelessly transmitting the information signal to the display apparatus and an operation signal receiver for wirelessly receiving the operation signal from the display apparatus. A control signal is generated when a received operation signal corresponds to an operation of an external input apparatus. The external input apparatus can, for example, be a set-top box, a video tape recorder, a digital versatile disk apparatus, or the like. An infrared transmitter transmits the control signal to the external input apparatus, which then executes the operation. The control signal transmitted to the external input apparatus is generally the same as an infrared signal from a remote control for the external input apparatus.

The base apparatus can also be connected to a plurality of external input apparatus. Each external input apparatus can be a source for the information signal and the control signals corresponding to operations of each external input apparatus. The operation display sequentially displays operation displays corresponding to each external input apparatus when the touched position is outside a currently displayed operation display.

The base apparatus may include a broadcast signal receiver for receiving broadcast signals and a channel selector for selecting a channel of the received broadcast signals in response to the operation signal. The information signal transmitter then transmits the selected channel as the information signal to the display apparatus when the operation signal is an instruction for transmitting the selected channel.

The base apparatus may also include a communication line connection for transmitting and receiving communication signals. The base apparatus then transmits received communication signals as the information signal to the display apparatus. The base apparatus can also transmit transmission information through the communication line when the operation signal from the display apparatus contains transmission information for transmittal to another party connected to the communication line.

A second embodiment of the invention is a display apparatus for use in a bi-directional communication system. The display apparatus has an information signal receiver for wirelessly receiving an information signal from a base apparatus. A display screen on the display apparatus displays a video corresponding to the received information signal. The display screen is preferably a liquid crystal display. An operation display—comprising a plurality of display items corresponding to user selectable operations—is displayed on the display screen. Preferably, the operation display is translucent and is superimposed on the display screen. A touch screen is provided on the display screen for detecting a location at which the user touches the display screen. An operation signal is then generated corresponding to the item displayed at the touched position on the display screen. An operation signal transmitter wirelessly transmits the generated operation signal to the base apparatus.

A third embodiment of the invention is a base apparatus for use in a bi-directional communication system. The base apparatus has an information signal transmitter for wirelessly transmitting an information signal to a display apparatus and an operation signal receiver for wirelessly receiving the operation signal from the display apparatus. A control signal is generated when a received operation signal corresponds to an operation of an external input apparatus. The external input apparatus can, for example, be a set-top box, a video tape recorder, a digital versatile disk apparatus, or the like. An infrared transmitter transmits the control signal to the external input apparatus, which then executes the operation. The control signal transmitted to the external input apparatus is generally the same as an infrared signal from a remote control for the external input apparatus.

A fourth embodiment of the invention is a method for a bi-directional communication system including a display apparatus and a base apparatus. The method wirelessly transmits an information signal from the base apparatus to the display apparatus which wirelessly receives the information signal. A video corresponding to the information signal is then displayed on a display screen of the display apparatus. An operation display is displayed on the display screen. The operation display comprises a plurality of display items corresponding to user selectable operations. Preferably, the operation display is translucent and is superimposed on the display screen. A touched position corresponding to a location on a touch screen on the display screen is detected. An operation signal corresponding to the display item displayed at the touched position on the display screen is generated. This operation signal is wirelessly transmitted from the display apparatus to the base apparatus. A control signal is generated when the operation signal corresponds to an operation of an external input apparatus. The control signal is transmitted as, for example, an infrared signal from the base apparatus to the external input apparatus which executes the operation. The control signal transmitted to the external input apparatus is generally the same as an infrared signal from a remote control for the external input apparatus.

Another aspect of the invention is that the method may include a broadcast signal receiving step of receiving broadcast signals and a channel selection step of selecting a channel of the received broadcast signals in response to the operation signal when the operation signal is an instruction for selecting the channel. The information signal transmission step transmits the selected channel as the information signal to the display apparatus when the operation signal is an instruction for transmitting the selected channel.

Another aspect of the invention is that the method may include a communication receiving step, by the base apparatus, of receiving a communication signal through a communication line. The information signal transmission step transmits the received communication signal as the information signal to the display apparatus when the operation signal is an instruction for transmitting the received communication signal. The base apparatus can also transmit transmission information through the communication line when the operation signal from the display apparatus contains transmission information for transmittal to another party connected to the communication line.

BRIEF DESCRIPTION OF THE DRAWINGS

For a more complete understanding of the invention, reference is made to the following description and accompanying drawings, in which.

DETAILED DESCRIPTION OF PREFERRED EMBODIMENTS

The preferred embodiments of the apparatus and method according to the present invention will be described with reference to the accompanying drawings.

Figure 1:
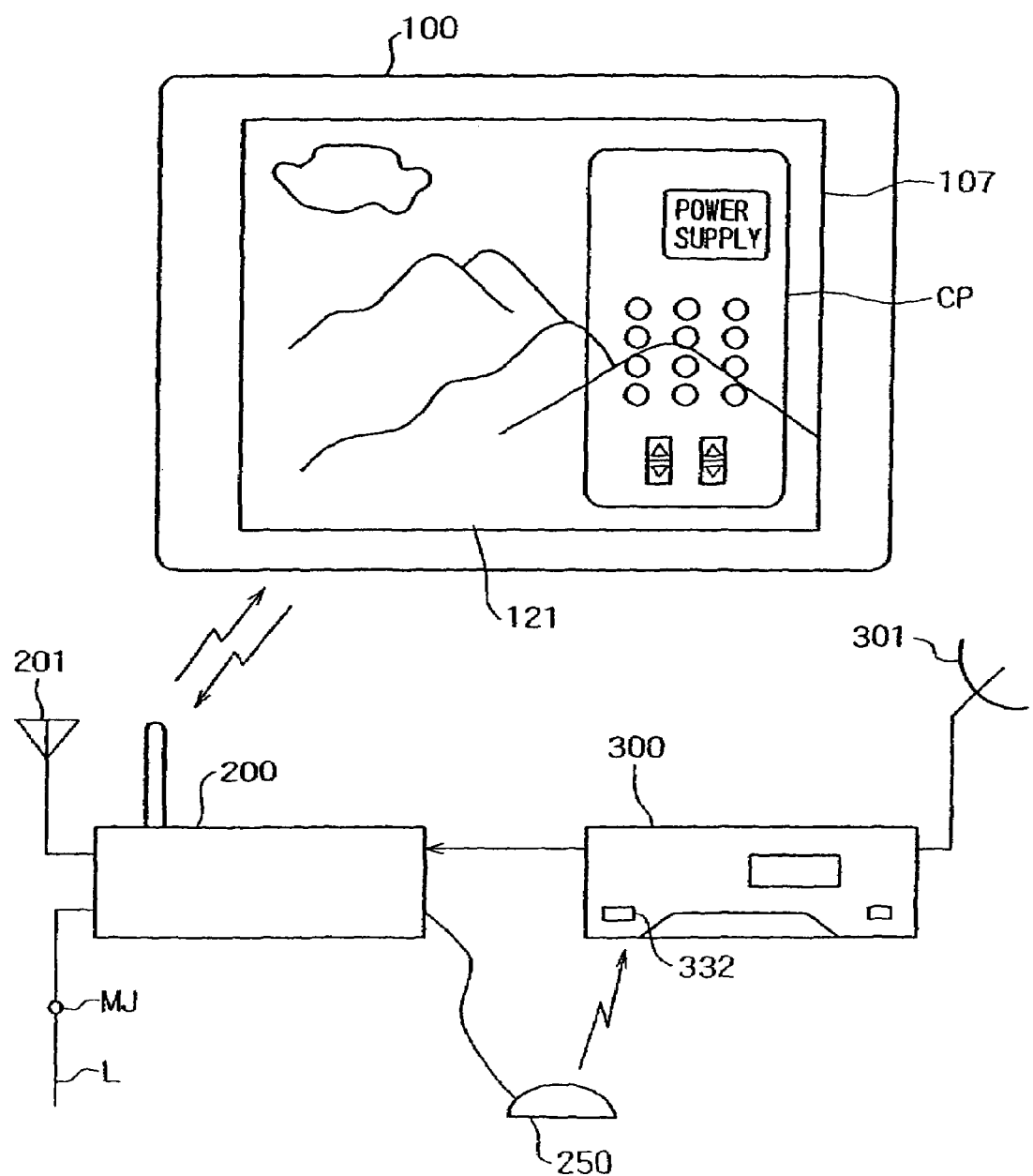
FIG. 1 is a system diagram showing a bi-directional communication system to which the present invention is applied.

Referring to FIG. 1, a bi-directional communication system to which the present invention is applied is shown. The bi-directional communication system uses a bi-directional communication method and includes a display apparatus 100, a base apparatus (base station) 200, and a set-top box 300 serving as an exemplary external input apparatus.

The display apparatus 100 is constructed in accordance with the present invention and includes an LCD 107 as a display. The display apparatus 100 does not require physical connection to the base apparatus 200. Rather the display apparatus communicates with the base apparatus by radio communication. In this manner, the display apparatus can receive an information signal from the base apparatus 200 and transmit a control signal to the base apparatus 200.

The base apparatus 200 has an antenna 201 and a tuner for receiving and selecting analog television broadcast signals. The base apparatus 200 further includes a modem and a connection terminal (modulator jack) MJ for connecting to a telephone line L. Thus, the base apparatus can be connected to a telephone network or the Internet.

The base apparatus 200 further has one or more external input terminals so that various external input apparatus, such as a video tape recorder (VTR), a set-top box, an integrated receiver decoder and/or a digital video disk (DVD) apparatus, can be connected to the base apparatus 200. In the arrangement shown in FIG. 1, the set-top box 300 is an external input apparatus connected through the external input terminal to the base apparatus 200.

The base apparatus 200 can compress data, such as a video signal and/or an audio signal from a television program, a communication network, and/or a satellite broadcast received by the set-top box 300. The compressed data is formed into a transmission signal and transmitted to the display apparatus 100.

The display apparatus 100 receives and demodulates the transmission signal from the base apparatus 200, extracts a video signal from the demodulated transmission signal and displays the video signal on the LCD 107. Further, the display apparatus 100 extracts an audio signal from the demodulated transmission signal and outputs the audio signal to a speaker (not shown).

The display apparatus 100 can display, on the LCD 107 thereof, the image of a control panel CP containing operating information and capable of accepting an operation input for controlling, for example, the set-top box 300. As shown in FIG. 1, a control panel image CP is provided for the set-top box 300 and includes a power supply on/off key, a numeric keypad for channel selection, channel up/down keys, and volume up/down keys.

The control panel CP is displayed in accordance with software executed by a control section of the display apparatus 100. As hereinafter described, a touch panel 121 is adhered to the LCD 107 to accept operation inputs from a user through the displayed control panel image.

The touch panel 121 of the display apparatus 100 can detect a coordinate position at which the LCD 107 is touched by a finger of the user or the like. The control section of the display apparatus 100 determines the operation key displayed on the control panel image CP at the touched position, forms an operation signal corresponding to the operation key, and wirelessly transmits the operation signal to the base apparatus 200.

A remote control signal transmitter 250, also referred to as a remote control mouse or the like, which transmits infrared remote control signals, is connected to the base apparatus 200. The remote control signal transmitter 250 forms a remote control signal in response to an operation signal from the display apparatus 100 and transmits the remote control signal to the set-top box 300.

The set-top box 300 has a remote control signal reception section 332 (formed from a photodetector) for receiving infrared remote control signals from a remote control. Thus, the set-top box 300 can receive a remote control signal from the remote control signal transmitter 250 connected to the base apparatus 200 and perform operations in accordance with the received remote control signal. For example, the remote control signal transmitter 250 can be used to switch the power on/off or to change the channel on the set-top box 300. Accordingly, the user can perform set-top box operations by using the control panel CP displayed on the LCD 107 of the display apparatus 100 and the touch panel 121. In this manner, the display apparatus 100 and the base apparatus 200 communicate bi-directionally, as do the base apparatus 200 and the set-top box 300, the latter functioning as an external input apparatus.

Because, the display apparatus 100 is small in size, light in weight, and connected to the base apparatus 200 only through radio communication, the display apparatus 100 can be easily carried. Consequently, a user can carry the display apparatus 100 anywhere within the range with which the display apparatus 100 can communicate with the base apparatus 200.

Accordingly, as described hereinabove, the user can use the display apparatus 100 to enjoy a television broadcast selected by the tuner of the base apparatus 200, enjoy a satellite broadcast selected by the set-top box 300, view a movie when a VTR or a DVD apparatus is connected as an external input apparatus to the base apparatus 200, and the like.

In addition, the user can use the display apparatus 100 to view a website on the Internet through the modem of the base apparatus 200, and receive and transmit electronic mail (e-mail). When preparing an e-mail, the user can display a software keyboard including, for example, alphabetical keys or symbol keys on the LCD 107 and prepare the e-mail through the software keyboard and the touch panel 121. The e-mail is then sent by operating a transmit key, also displayed on the control panel, which sends the e-mail to the base apparatus 200 for transmission across the telephone line.

In this manner, the base apparatus 200 serves as a link between the display apparatus 100 and external input apparatus such as the set-top box 300, information transmission media such as a ground wave television broadcast (cable television), and communication networks such as the Internet. Thus, the display apparatus 100 receives an information signal from the base apparatus 200 for display to the user, and forms transmission information, such as e-mails, and transmits the transmission information through the base apparatus 200.

Figure 2:
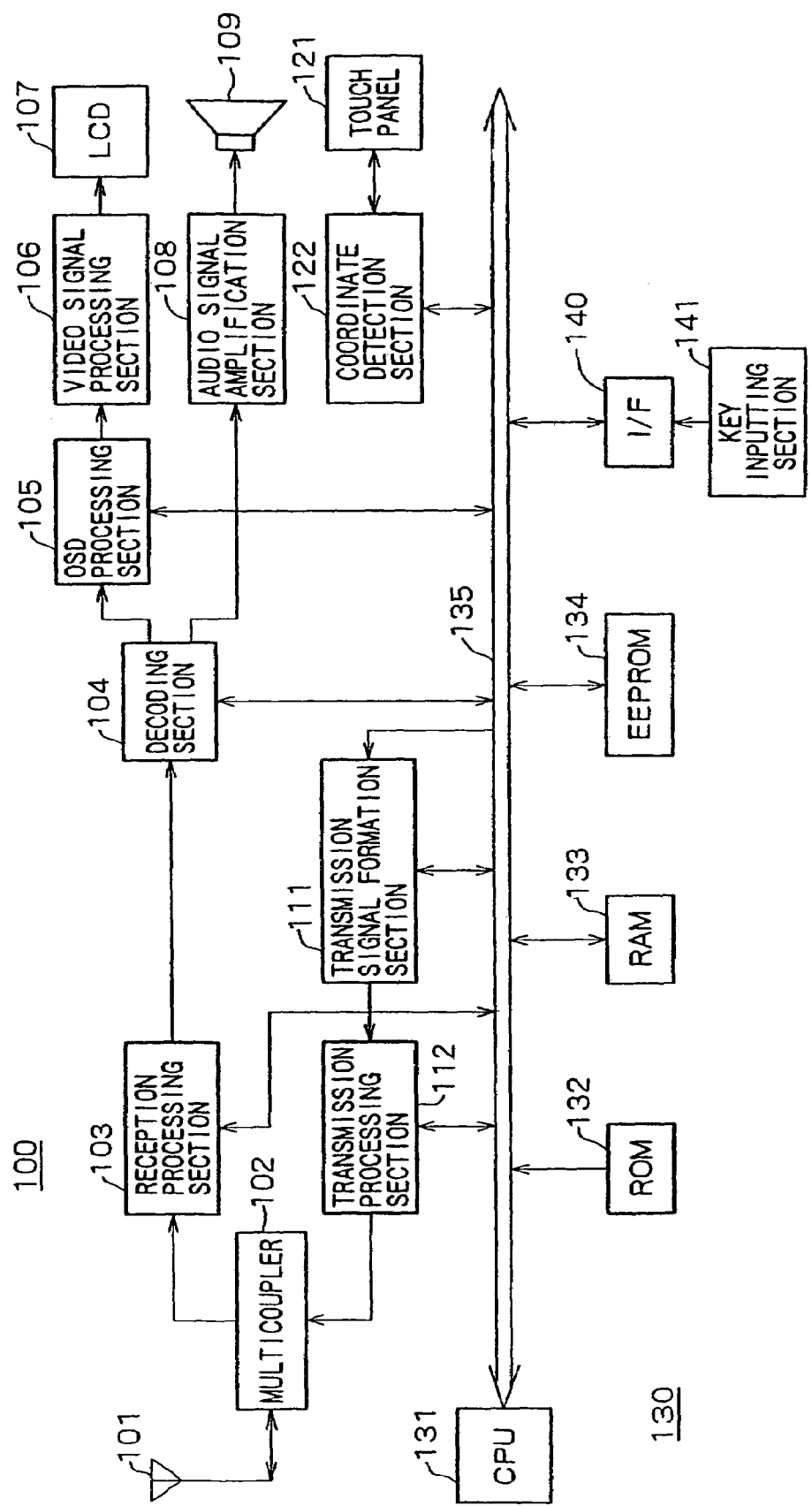
FIG. 2 is a block diagram showing a display apparatus to which the present invention is applied.
Figure 9A:
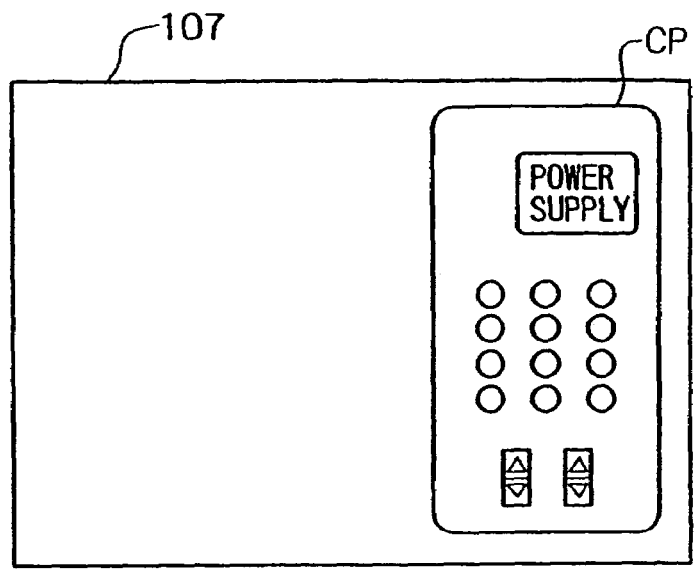
FIGS. 9A, 9B and 9C are illustrations showing exemplary control panels displayed by the display apparatus for controlling various external input apparatuses connected to the base apparatus shown in FIG. 3.
Figure 9B:
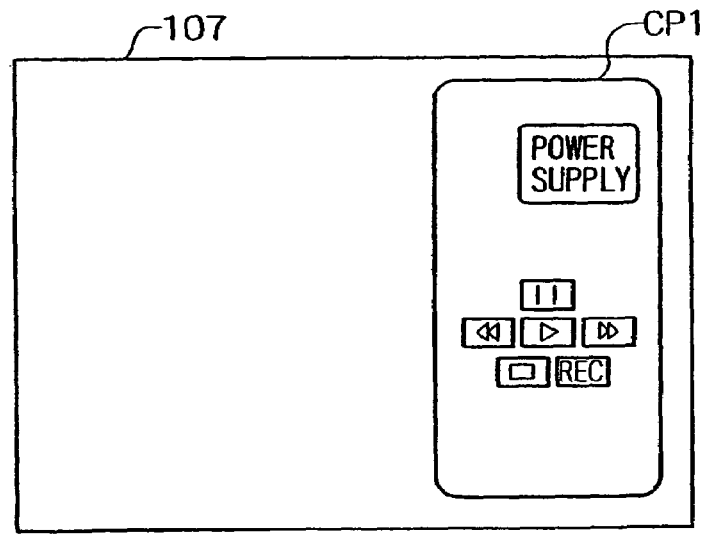
Figure 9C:
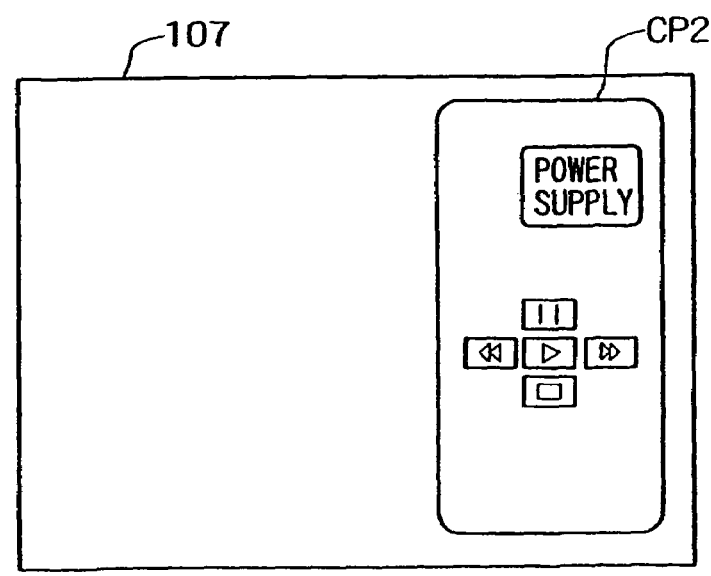

Referring to FIG. 2, the components of the display apparatus 100 are described. The display apparatus 100 includes a transmission/reception antenna 101, an antenna multicoupler 102, a reception processing section 103, a decoding section 104, an on-screen display (OSD) processing section 105, a video signal processing section 106, an LCD 107, an audio signal amplification section 108, a speaker 109, a transmission signal formation section 111 a transmission processing section 112, a touch panel 121, and a coordinate detection section 122. The components of the display apparatus 100 are controlled by a control section 130. The control section 130 may be a microcomputer including a central processing unit (CPU) 131, a read only memory (ROM) 132, a random access memory (RAM) 133, and an electrically erasable programmable read only memory (EEPROM) 134, that are connected to each other by a bus 135. The ROM 132 stores various processing programs to be executed by the display apparatus 100, predetermined display data for the control panels corresponding to the connected external input apparatuses (e.g., STB, VTR, DVD) as shown in FIGS. 9A–9C, and command data for the current models of input apparatuses from each manufacturer. When a user connects an external input apparatus to the base apparatus, the user selects the model from a list of current models stored in ROM 132 so that the corresponding control panel can be properly displayed on the display apparatus. The RAM 133 is used principally as a working area for various processes for temporarily storing data and other necessary information. The EEPROM 134 is a nonvolatile memory and maintains its stored information even if the power supply is disconnected. Thus, for example, the EEPROM 134 can store various setting parameters, a homepage on the Internet acquired through the base apparatus 200, an electronic mail prepared to be transmitted through the base apparatus 200 or a received electronic mail, as hereinafter described.

First, operation of the display apparatus 100 when receiving a radio signal from the base apparatus 200 is described. In the present embodiment, a predetermined communication protocol such as the IEEE (Institute Electrical and Electronics Engineers) 802.11 system or a similar protocol is used to effect radio communication between the display apparatus 100 and the base apparatus 200. A radio signal from the base apparatus 200 which conforms with the predetermined protocol is received by the transmission/reception antenna 101 of the display apparatus 100 and supplied to the reception processing section 103 through the antenna multicoupler 102. The multicoupler 102 is provided to prevent potential interference between a transmission signal and a reception signal. The multicoupler 102 prevents a transmission signal from the transmission processing section 112 from interfering with a signal received by the transmission/reception antenna 101. Thus, the display apparatus 100 can receive signals from the base apparatus 200 through the transmission/reception antenna 101 and can transmit operation signals through the antenna, as described hereinafter.

The reception processing section 103 performs required processing, including demodulation of a received signal, and supplies the demodulated signal to the decoding section (decompression processing section) 104. As described previously, the base apparatus 200 can compress data into an information signal from various sources, for example, a video signal and/or an audio signal of a television broadcast program selected by the base apparatus' tuner, display data such as text, video, and/or audio data received through the modem, or a video signal and/or audio signal of a satellite broadcast program from the set-top box 300. The base apparatus then transmits the compressed data to the display apparatus 100.

The decoding section 104 of the display apparatus 100 receives the demodulated signal of compressed data from the reception processing section 103, demultiplexes the signal into a video signal and an audio signal, and decompresses the signal to restore the signal to its condition prior to data compression. The decoding section converts the restored video signal and audio signal from a digital format to form an analog video signal and an analog audio signal. Then, the decoding section 104 supplies the analog video signal to the on-screen display processing section 105 and supplies the analog audio signal to the audio signal amplification section 108.

The on-screen display processing section 105 is a text/graphic processing circuit for performing video signal processing that allows the control panel CP and various messages to be displayed in accordance with data supplied thereto from the control section 130. This section also allows display information such as characters, pictures and symbols to be displayed in addition to video of a broadcast program. For example, when a control panel is to be displayed in response to a viewer's instruction, information for displaying the control panel is supplied from the control section 130 to the on-screen display processing section 105. Then, the control panel is synthesized with the video signal from the decoding section 104 by the on-screen display processing section 105, and the resulting signal is supplied to the video signal processing section 106.

For example, when character information indicating channel selections or a volume bar indicating the volume level is to be displayed, information for the same is supplied from the control section 130 to the on-screen display processing section 105. Then, the control panel is synthesized with the video signal from the decoding section 104, and the resulting signal is supplied to the video signal processing section 106. When a control panel CP is not going to be displayed, the on-screen display processing section 105 simply supplies the analog video signal from the decoding section 104 to the LCD 107. The video signal processing section 106 forms a display signal from the video signal and supplies the display signal to the LCD 107.

In this manner, video information corresponding to the video signal transmitted by radio from the base apparatus 200 is displayed on the display screen of the LCD 107. If display information, such as a control panel or the like, is synthesized by the on-screen display processing section 105, then the display information is displayed along with the video information.

Meanwhile, the audio signal amplification section 108 amplifies the audio signal supplied thereto to a predetermined level and supplies the resulting audio signal to the speaker 109. Consequently, sound corresponding to the audio signal transmitted by radio from the base apparatus 200 is output from the speaker 109. Thus, the display apparatus 100 can receive a video signal and/or an audio signal of a television broadcast program transmitted by radio from the base apparatus 200 and playback and output the received video signal and/or audio signal to a viewer.

The operation of the display apparatus 100 when displaying a control panel on the LCD 107 and accepting an operation input from the user and transmitting an operation signal corresponding to the operation input to the base apparatus 200 is now described. The following describes the situation wherein the display apparatus 100 displays a control panel CP for controlling the set-top box 300 as shown in FIG. 1 and accepts an operation input from the user destined for the set-top box 300.

As described hereinabove, the touch panel 121 is adhered to the LCD 107 of the display apparatus 100. If the user touches the touch panel 121 with his/her finger or the like while the display apparatus 100 is powered, but when no control panel is being displayed, then the coordinate detection section 122 detects the touched position (coordinate position) on the touch panel 121 and notifies the control section 130 of this touched position. When the control section 130 receives notification of a touched position when no control panel is being displayed, it interprets the touch as signifying an instruction to display a control panel. Thus, upon receipt of the notification from the coordinate detection section 122, the control section 130 first reads out information necessary for displaying the control panel CP for the set-top box 300 from the ROM 132, forms the information needed to display the control panel CP, and supplies the information to the on-screen display processing section 105. The on-screen display processing section 105 receives the information from the control section 130, forms a video signal to display the control panel CP, synthesizes this video signal with an analog video signal from the decoding section 104 and displays the control panel CP on the display screen of the LCD 107 as shown in FIG. 1.

In the present embodiment, in order to prevent the control panel from covering up the video displayed on the LCD 107, the control section 130 uses an alpha blending technique to include an alpha value ($\alpha$ value) representing a degree of transparency (translucence) for the control panel CP and a color designation for the control panel. This control panel color and transparency information is supplied to the on-screen display processing section 105. Consequently, the control panel CP is displayed on the LCD 107 without completely covering the video. As shown in FIG. 1, the control panel CP is displayed so that a mountain in the video signal can be seen through the control panel.

Once a control panel is displayed, if the user touches a position on the touch panel 121, corresponding to the position of an object operation key of the control panel CP, then the touched position is detected by the coordinate detection section 122 and conveyed to the control section 130. The control section 130 identifies which operation key was touched and forms and supplies an operation signal corresponding to the operation key to the transmission signal formation section 111. The transmission signal formation section 111 forms a transmission signal to be transmitted to the base apparatus 200 based on the operation signal and supplies the transmission signal to the transmission processing section 112. The transmission processing section 112 processes the transmission signal supplied thereto for transmission such as modulation and amplification to form a transmission signal of a format to be transmitted and transmits the transmission signal by radio through the multicoupler 102 and the transmission/reception antenna 101 to the base apparatus 200.

The operation signal transmitted by radio from the display apparatus 100 in this manner is received by the base apparatus 200. In the present example, the base apparatus 200 then forms a remote control signal for the set-top box 300 in response to the operation signal from the display apparatus 100 and transmits the remote control signal so that the set-top box 300 may be remotely controlled.

A key inputting section 141 is connected to the display apparatus 100 through an interface (denoted by I/F in FIG. 2) 140. The key inputting section 141 includes, for example, a power supply on/off switch. An operation input to the key inputting section 141 is supplied through the interface 140 to the control section 130 for processing in accordance with the operation key (e.g., connection of the power supply).

In the above description, an operation signal for the set-top box 300 is transmitted through the control panel CP to the set-top box 300. However, the base apparatus 200 can also be remotely controlled by the display apparatus 100. In particular, to remotely control the base apparatus 200, a control panel for the base apparatus 200 is displayed. As before, if the touch panel 121 is touched while the display is powered and no control panel is being displayed, then the control panel CP for the set-top box 300 is first displayed as described hereinabove. Then, if the user touches the touch panel 121 in an area other than the area of the control panel CP, the control section 130 determines that this is an instruction to display a control panel for the base apparatus 200. The control section 130 can then accept an operation input for the base apparatus 200 and transmit an operation signal corresponding to the operation input to the base apparatus 200. The base apparatus 200 then discriminates whether the operation signal from the display apparatus 100 is for itself or for an external input apparatus, such as the set-top box 300. If the operation signal is for an external input apparatus, then the base apparatus 200 transmits the operation signal to the external input apparatus as described hereinabove. On the other hand, if the operation signal from the display apparatus 100 is for the base apparatus 200 itself, the base apparatus 200 controls itself in accordance with the operation signal. Note that the control panel for the base apparatus 200 may include a numeric keypad (1 to 12) for selecting channels of the tuner 202, channel up/down keys, and volume up/down keys. The base apparatus control panel may further include a changeover key for changing whether the base apparatus 200 should output a signal corresponding to a television broadcast, information received through the modem, or information from an external input apparatus connected to the base apparatus. Thus, the control panel for the base apparatus 200 can be used to remotely control power, channel selection, and changeover of a signal source.

Figure 3:
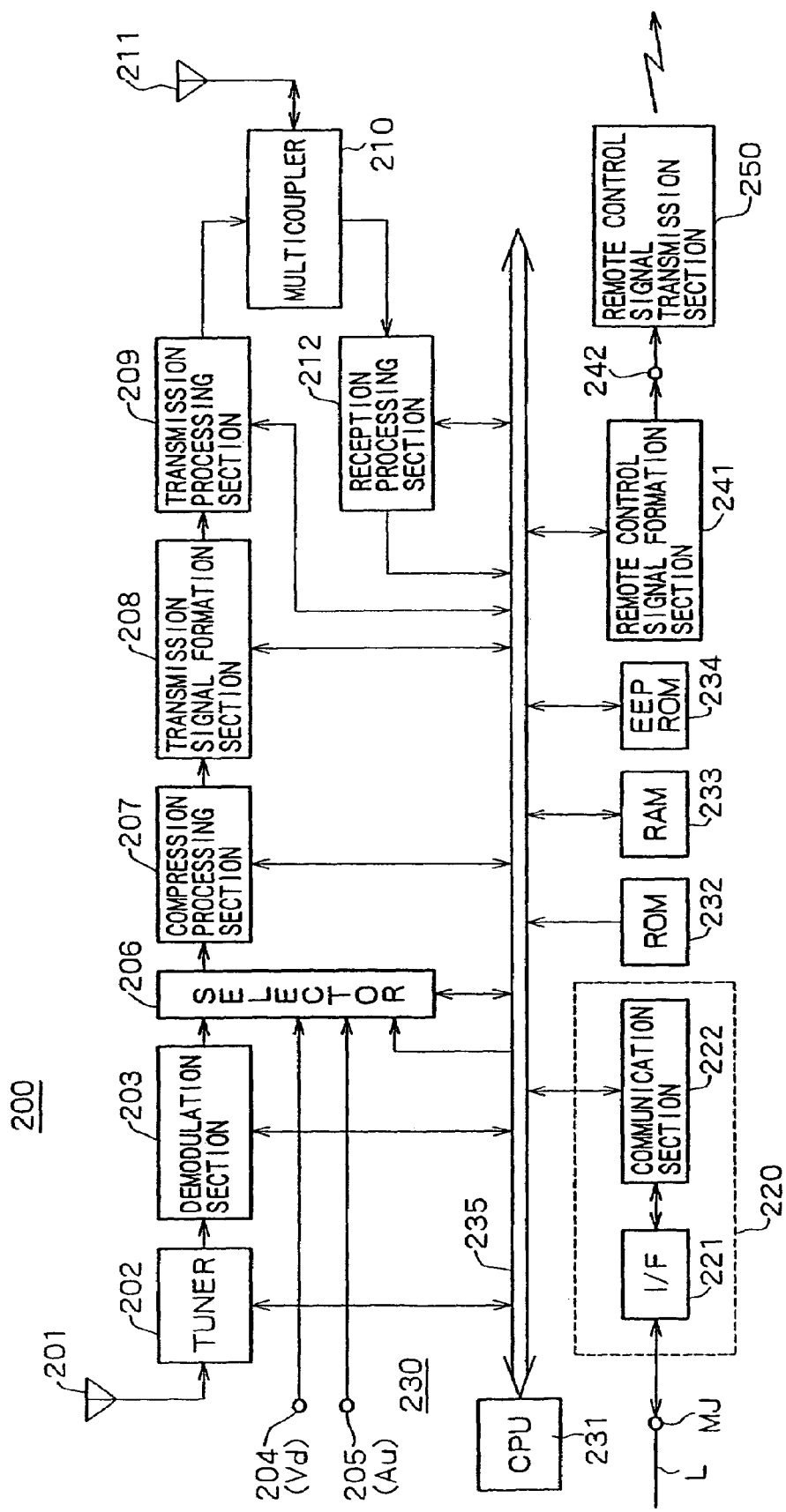
FIG. 3 is a block diagram showing a base apparatus to which the present invention is applied.

Referring to FIG. 3, the base apparatus 200 shown in FIG. 1 will now be described in detail. The base apparatus 200 includes a tuner 202 connected to a reception antenna 201 for receiving analog television broadcast signals, a demodulation section 203, an input terminal 204 for a video signal (Vd), another input terminal 205 for an audio signal (Au), a selector 206, a compression processing section 207, a transmission signal formation section 208, a transmission processing section 209, an antenna multicoupler 210, a transmission/reception antenna 211, and a reception processing section 212. The components of the base apparatus 200 are controlled by a control section 230. The control section 230 may be a microcomputer composed of a CPU 231, a ROM 232, a RAM 233 and an EEPROM 234 connected to one another by a CPU bus 235. The ROM 232 stores various processing programs to be executed by the base apparatus 200 and data necessary for such processing. The RAM 233 is used principally as a working area for various processes for temporarily storing data and other necessary information. The EEPROM 234 is a nonvolatile memory and maintains its stored information even if the power supply is disconnected. Thus, for example, the EEPROM 234 is used to realize a last channel memory function of storing the last broadcast channel received prior to turning the power off, so that when power is turned on again the previous channel is selected.

A modem section 220 is connected to the control section 230. The modem section 220 includes an interface (I/F) section 221 and a communication section 222. The I/F section 221 interfaces a communication line (in the present embodiment this is a telephone line) and the base apparatus 200, such that it receives signals transmitted thereto through the telephone circuit and transmits signals from the base apparatus 200 to the telephone circuit. The communication section 222 demodulates a signal received through the I/F section 221 and supplies the demodulated signal to the control section 230. Further, the communication section 222 modulates a transmission signal from the control section 230 and supplies the modulated transmission signal to the I/F section 221. Consequently, the base apparatus 200 can transmit and receive various data to and from an object party through the telephone circuit connection. Through the modem section 222, the base apparatus 200 can be connected to the Internet using a telephone line L and an Internet service provider (ISP) to receive and transmit information (e.g., electronic mail) through the Internet. To this end, the control section 230 controls the modem section 220 to establish an off-hook state or an on-hook state and function as a dialer for the telephone circuit.

The remote control signal transmission section 250 is connected to the control section 230 through a remote control signal formation section 241 and an output terminal 242 for the remote control signal. As described hereinabove, the remote control signal transmission section 250 forms a remote control signal in response to an operation signal from the display apparatus 100 and transmits the remote control signal. Although not shown in FIG. 3, a key inputting section having a power supply on/off key and various setting keys is also connected to the control section 230.

Broadcast signals received by the antenna 201 are supplied to the tuner 202 of the base apparatus 200, as shown in FIG. 3. The tuner 202 selects a television broadcast signal corresponding to a channel instruction signal from the control section 230 and supplies the selected television broadcast signal to the demodulation section 203. The demodulation section 203 demodulates the television broadcast signal and supplies the demodulated signal to the selector 206. A video signal input through video input terminal 204 and an audio signal input through audio input terminal 205 are supplied to the selector 206 in addition to the information from the control section 230. The information supplied from the control section 230 to the selector 206 may be, for example, a website on the Internet or e-mail.

The selector 206 switchably outputs in response to a switching control signal from the control section 230 either the signal from the demodulation section 203, the signals from the input terminals 204 and 205, or the signal from the control section 230. The switching control signal is formed by the control section 230 in accordance with the operation signal transmitted from the display apparatus 100 as described previously. The output signal from the selector 206 is then supplied to the compression processing section 207. The compression processing section 207 compresses data using a predetermined compression method, for example, MPEG or a wavelet processing method. The signal compressed by the compression processing section 207 is then supplied to the transmission signal formation section 208. The transmission signal formation section 208 forms a transmission signal in conformity with a predetermined communication protocol. As described hereinabove, the base apparatus 200 in the present embodiment forms a transmission signal in conformity with, for example, the IEEE (Institute Electrical and Electronics Engineers) 802.11 system. The transmission signal formed by the transmission signal formation section 208 is supplied to the transmission processing section 209. The transmission processing section 209 performs modulation processing and amplification of the transmission signal in accordance with a control signal from the control section 230. The transmission signal processed by the transmission processing section 209 is transmitted by radio through the multicoupler 210 and the transmission/reception antenna 211. The multicoupler 210 is provided to prevent possible interference between a transmission signal and a reception signal, similar to the multicoupler 102 of the display apparatus 100 described previously. In this manner, the base apparatus 200 can compress text data, video data and/or audio data of a television broadcast program selected by the tuner 202, a video signal and/or an audio signal accepted through the input terminals 204 and 205, or information acquired through the modem section 220 and transmit the compressed data by radio in accordance with a predetermined communication protocol to the display apparatus 100.

Operation of the base apparatus 200 when an operation signal is transmitted by radio from the display apparatus 100 is now described. An operation signal from the display apparatus 100 received through the transmission/reception antenna 211 is supplied to the reception processing section 212 through the multicoupler 210. The reception processing section 212 demodulates the signal supplied thereto and further performs necessary processing such as A/D (analog/digital) conversion to convert the signal into a signal which can be handled by the control section 230.

If the signal from the reception processing section 212 is an operation signal for an external input apparatus, for example the set-top box 300, then the control section 230 supplies the received operation signal to the remote control signal formation section 241 which forms a remote control signal corresponding to the received operation signal. The remote control signal formation section 241 supplies the remote control signal through the output terminal 242 to the remote control signal transmission section 250. The remote control signal transmission section 250 then transmits the remote control signal as an infrared transmission. In this manner, the operation for the set-top box 300 is sent as an infrared remote control signal to the set-top box 300.

If the signal from the reception processing section 212 is an operation signal for the base apparatus 200 itself, then the control section 230 controls the pertaining components of the base apparatus 200 in accordance with the received operation signal. Consequently, it is possible to change the channel selected by the tuner 202 or change over the signal output from the selector 206.

On the other hand, if the signal from the reception processing section 212 is an acquisition request for a website or a reception/transmission request for electronic mail then the control section 230.controls the modem section 220 to establish a connection to the subscribed ISP, thereby connecting the base apparatus 200 to the Internet. Consequently, the base apparatus 200 can acquire information from a website, and receive or transmit electronic mail.

In this manner, the base apparatus 200 can receive, select and demodulate a television broadcast signal, receive and demodulate a video signal and/or an audio signal from an external input apparatus supplied through the input terminals 204 and 205, or video data and/or audio data supplied through the modem section 220 and the telephone circuit; then compress the demodulated video data and/or audio data and transmit the compressed video data and/or audio data by radio in accordance with a predetermined communication protocol. Further, the base apparatus 200 in the present embodiment can receive an operation signal transmitted thereto by radio from the display apparatus 100 and control the base apparatus 200 in accordance with the operation signal, form and transmit a remote control signal for controlling an external input apparatus or transmit information received by radio from the display apparatus 100 through the modem section 220.

Figure 4:
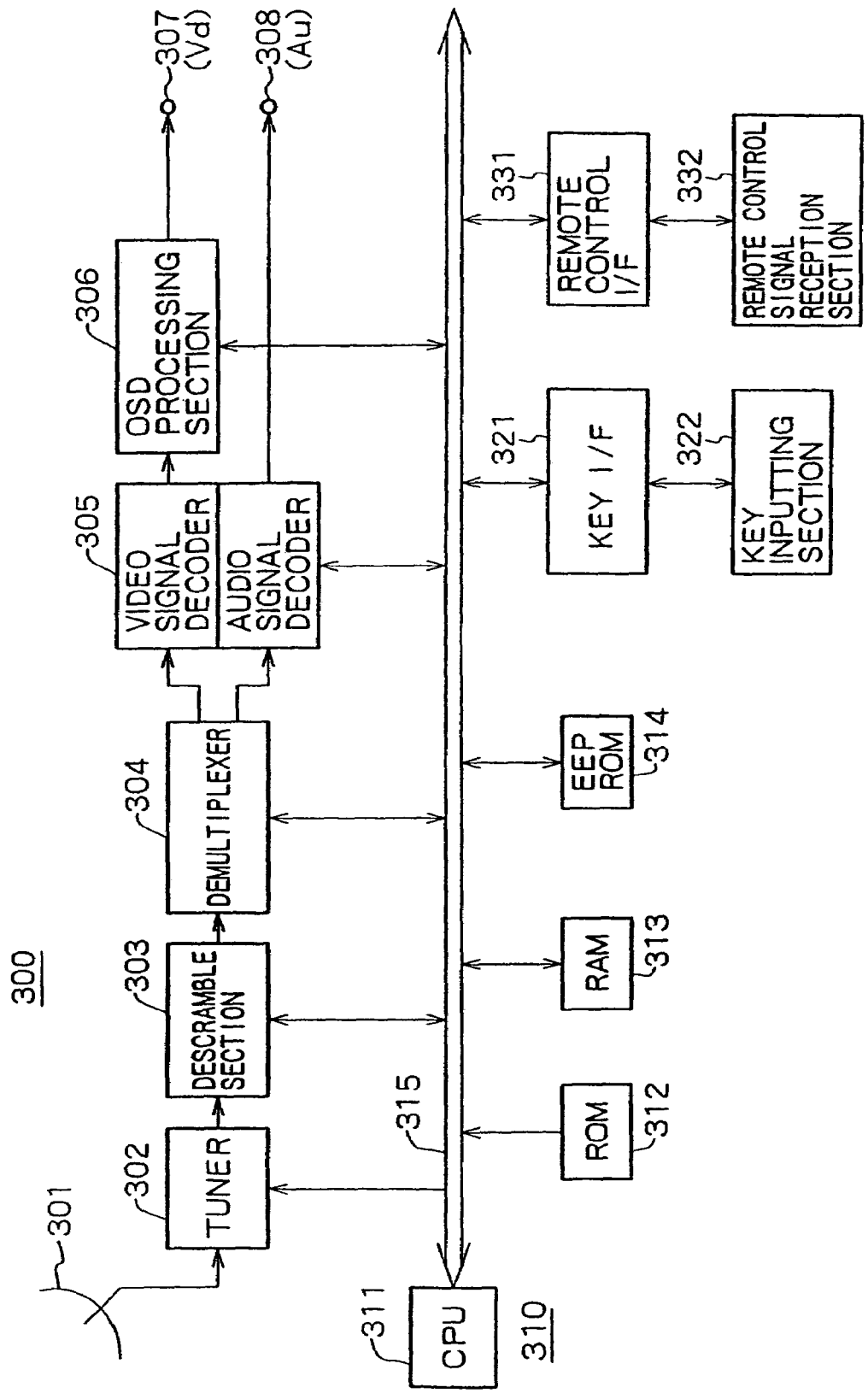
FIG. 4 is a block diagram showing a set-top box serving as an external input apparatus for the bi-directional communication system shown in FIG. 1.

FIG. 4 is a block diagram showing the set-top box 300 connected as an external input apparatus to the base apparatus 200. The set-top box 300 includes a digital tuner 302 connected to an antenna 301 for receiving satellite broadcasts, a descramble section 303, a demultiplexer 304, a decoding section 305 having a video signal decoder and an audio signal decoder, an on-screen display (OSD) processing section 306, an output terminal 307 for a video signal (Vd), and an output terminal 308 for an audio signal (Au). The set-top box 300 further includes a control section 310, a key interface (key I/F) 321, a key input section 322, a remote control interface (remote control I/F) 331 and a remote control signal reception section 332. The control section 310 is a microcomputer comprised of a CPU 311, a ROM 312, a RAM 313, and an EEPROM 314 connected by a CPU bus 315 and which controls the components of the set-top box 300. The ROM 312 stores various processing programs to be executed by the set-top box 300 and data necessary for such processing. The RAM 313 is used principally as a working area for temporarily storing intermediate results from the processing. The EEPROM 314 is a nonvolatile memory and maintains its stored information even if the power supply is disconnected. Hence, the EEPROM 234 is used to store various parameter information set by the user. The key input section 322 includes a power on/off key and various adjustment keys. If an operation input from the user is accepted by the key input section 322, then the operation input is supplied through the key I/F 321 to the control section 310 for execution.

The remote control signal reception section 332 can receive a remote control signal of infrared rays from the remote controller for the set-top box 300, convert the remote control signal into an electric signal and supply the electric signal to the control section 310 through the remote control I/F 331. In other words, the set-top box 300 can be remotely controlled through the remote controller. Moreover, the remote control signal reception section 332 can receive signals not only from the remote controller for the set-top box 300, but also from the remote control signal transmission section 250 of the base apparatus 200. Consequently, remote control of the set-top box 300 can be performed in accordance with the remote control signal of infrared rays transmitted from the base apparatus 200 in response to the operation signal from the display apparatus 100.

When the set-top box 300 is on, it receives digital satellite broadcast signals and outputs a video signal and an audio signal of a selected channel. Note that digital broadcast signals are broadcast in the form of a transport stream (TS) of the MPEG system. Each satellite broadcast signal includes packetized and time division multiplexed signals and data including a video signal and an audio signal for a plurality of broadcast programs, data used for channel selection, and data for displaying an EPG (electronic program guide). Digital satellite broadcast signals in the form of a transport stream are received by a reception antenna 301 located outdoors and are supplied to the tuner 302. The tuner 302 selects and demodulates one of the satellite broadcast signals in accordance with a channel selection control signal sent by the control section 310, and supplies the demodulated broadcast signal to the descramble section 303. The channel selection control signal is formed by the control section 310 in accordance with a remote control signal from the user of the display apparatus 100 which has been received through the remote control signal reception section 332.

The descramble section 303 receives, for example, key information for decoding or deciphering signals from the control section 310, and deciphers (cancels) the scrambled (encoded or enciphered) data, and supplies the descrambled satellite broadcast signal to the demultiplexer 304. As described above, the satellite broadcast signal is in the form of a transport stream of packetized and time division multiplexed data including video data and audio data for a plurality of broadcast programs, digital data regarding the broadcasts, and digital data used for formation of an electronic program guide. This format allows a single satellite broadcast signal to provide a plurality of programs and information. Each packet of the satellite broadcast signal has a PID (packet identifier) added thereto such that the set-top box 300 can separate and extract an object packet from the satellite broadcast signal. The demultiplexer 304 extracts video data and audio data of a program broadcast on the channel selected by the user and supplies the extracted data to the decoding section 305. Further, the demultiplexer 304 extracts various data regarding the broadcast and data for forming an electronic program guide from the satellite broadcast signal and supplies the extracted data to the control section 310. The data extracted from the satellite broadcast signal and supplied to the control section 310 in this manner is used to select an object program or to form an electronic program guide in accordance with an instruction from the user.

The elementary stream (ES) of the broadcast program, (i.e. the video data and the audio data of the program) is data compressed in accordance with a coding method of the MPEG system. Therefore, the video signal decoder of the decoding section 305 expands (decompresses) the video data to restore the signal prior to data compression then converts the decompressed digital video signal to obtain an analog signal and supplies the analog video signal to the on-screen display processing section 306.

The on-screen display processing section 306 of the set-top box 300 is a text/graphic processing circuit which performs video signal processing to allow various messages or an electronic program guide to be displayed. Thus, display information of characters, pictures, symbols, and so forth may be displayed, similarly to the on-screen display processing section 105 of the display apparatus 100.

Accordingly, the on-screen display processing section 306 synthesizes message information with the video signal or forms a video signal to be used to display an electronic program guide and outputs this synthesized or formed signal. Note that if an instruction to synthesize message information or to display an electronic program guide is not received by the set-top box 300, then the video signal from the decoding section 305 is output through the on-screen display processing section 306 to the output terminal 307. The video signal output from the set-top box 300 is then supplied to the base apparatus 200 through the input terminal 204 of the base apparatus 200 as described hereinabove.

Meanwhile, the audio signal decoder of the decoding section 305 decompresses the audio data to restore the signal prior to data compression then converts the decompressed digital signal into an analog signal and outputs the analog audio signal through the output terminal 308. The audio signal output from the set-top box 300 is supplied to the base apparatus 200 through the input terminal 205 of the base apparatus 200 similarly to the video signal.

As described above, a remote control signal of infrared rays transmitted to the set-top box 300 from the remote control signal transmission section 250 of the base apparatus 200 is received by the remote control signal reception section 332. Then, the remote control signal is converted into an electric signal by the remote control signal reception section 332, and the electric signal is supplied to the control section 310. The remote control signal may include an instruction for turning the set-top box 300 on or off, a channel changing instruction, or control the demultiplexer 304 to change the program data to be extracted.

In the bidirectional communication system which includes the display apparatus 100, base apparatus 200 and set-top box 300 described above, the base apparatus 200 transmits a video signal and an audio signal of a television broadcast signal received through the tuner 202, information received through the modem section 220, or a video signal and an audio signal supplied from an external input apparatus such as the set-top box 300. This signal is wirelessly transmitted to the display apparatus 100. The display apparatus 100 receives, plays back and outputs the video signal and/or the audio signal transmitted from the base apparatus 200. Consequently, the user can enjoy a broadcast program provided by an analog television broadcast signal, a digital satellite broadcast, or information provided through a network such as the Internet. The display apparatus 100 accepts an operation input from a user through a control panel displayed on the LCD 107 and transmits an operation signal corresponding to the operation input by radio to the base apparatus 200, so as to remotely control the base apparatus 200 or the set-top box 300.

Figure 6:
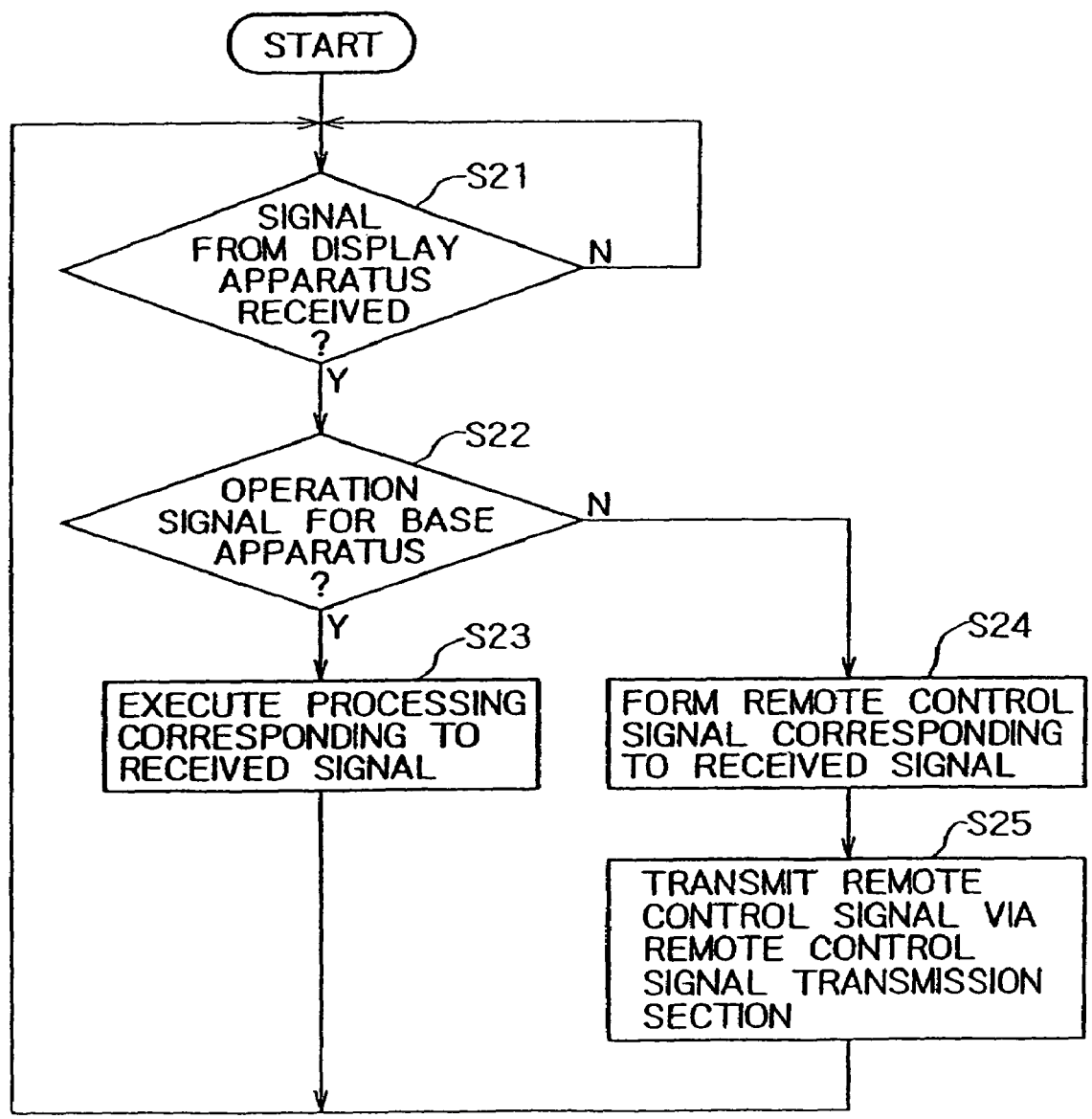
FIG. 6 is a flow chart illustrating the operation of the base apparatus shown in FIG. 3 when an operation signal is received from the display apparatus shown in FIG. 2.
Figure 7:
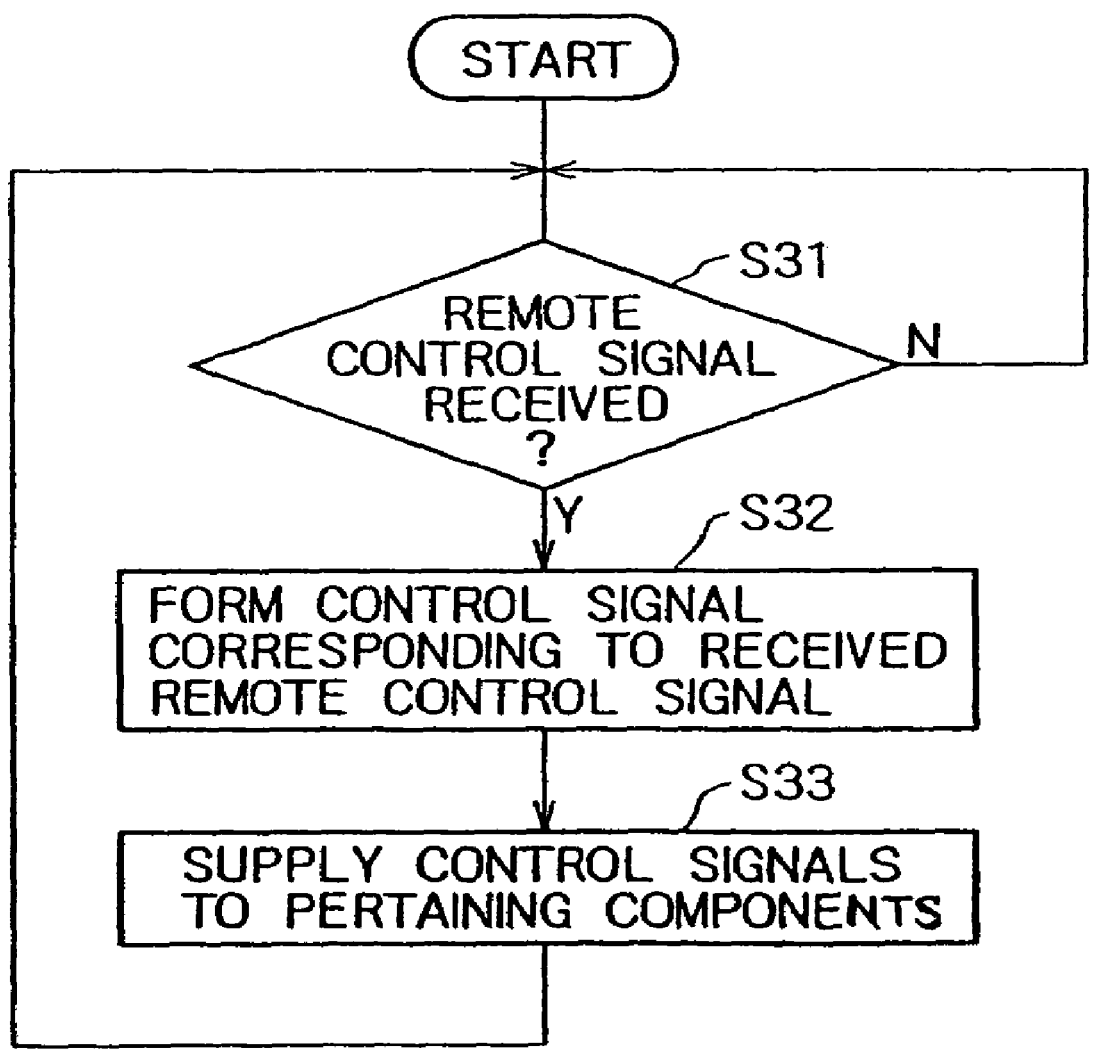
FIG. 7 is a flow chart illustrating the operation of the set-top box shown in FIG. 4 when a remote control signal is received from the base apparatus shown in FIG. 3.

Processing when the set-top box 300 is remotely controlled through a control panel displayed on the LCD 107 is now described with reference to the flow charts shown in FIGS. 5 to 7.

Figure 5:
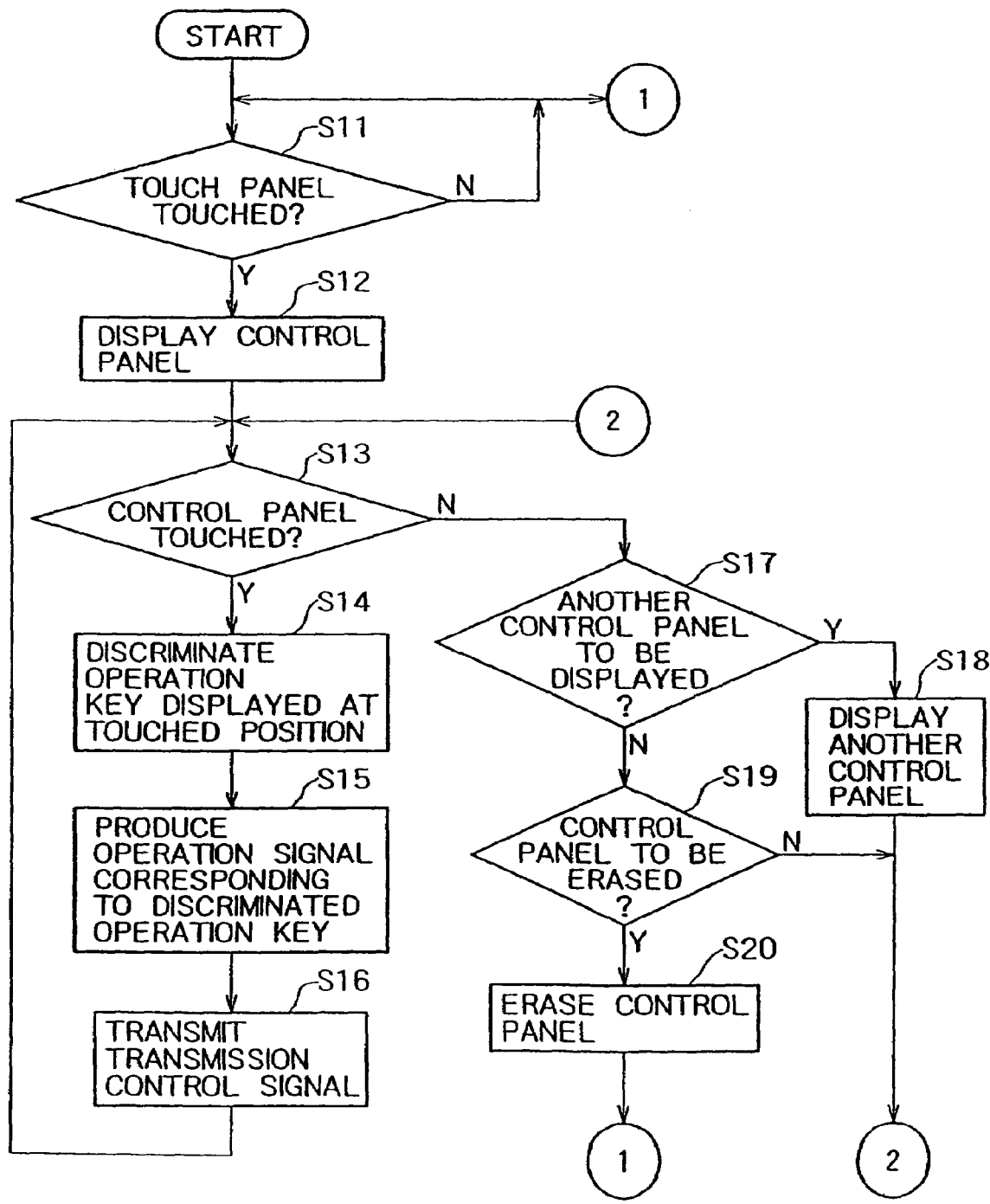
FIG. 5 is a flow chart illustrating the operation of a control panel displayed by the display apparatus shown in FIG. 2.

FIG. 5 is a flow chart illustrating the processing executed by the control section 130 of the display apparatus 100 once the display apparatus 100 is turned on. First, the control section 130 of the display apparatus 100 determines whether or not a touch of the touch panel 121 by a user has occurred (step S11) and if not waits until a touch is detected. If in step S11, the touch panel 121 is touched, then the control section 130 displays the control panel CP for the set-top box 300 (step S12) and accepts an operation input through the control panel CP. Then, the control section 130 of the display apparatus 100 determines whether or not a touch of the control panel CP by the user occurs, that is, whether or not an operation input from the user is accepted (step S13). If it is determined in step S13 that an operation input from the user is accepted, then the control section 130 determines which operation key of the control panel is displayed at the touched position- based on a detection output from the coordinate detection section 122 (step S14). The control section 130 then forms an operation signal corresponding to the discriminated operation key and supplies the operation signal to the transmission signal formation section 111, such that a transmission signal is formed by the transmission signal formation section 111 (step S15). Then, the transmission signal is transmitted by radio to the base apparatus 200 through the transmission processing section 112, multicoupler 102 and transmission/reception antenna 101 (step S16). The processing then returns to step S13 to await further operation inputs by the user.

On the other hand, if it is determined in step S13 that a touch of the control panel has not occurred, then the control section 130 determines whether or not an instruction to display another control panel is received (step S17). The determination in step S17 is whether or not the user touches the touch panel 121 in a location outside the display region of the control panel. If an instruction to display another control panel is received, then the control section 130 displays another control panel. In the present embodiment, a control panel for the base apparatus 200 (step S18) is displayed next. Thereafter, the processing returns to step S13 to accept an operation input to the newly displayed control panel.

If an instruction to display another control panel is not received, then the control section 130 determines whether or not an instruction to erase the control panel is received (step S19). If an instruction to erase the control panel is received, then the control panel is erased and the processing returns to step S11. If no instruction is received, the process cycles back to step S13. If the process has cycled back to step S13 a predetermined number of times (corresponding to a time-out period), the control section 130 interprets this period of time as an instruction to erase the control panel and executes step S20.

In this manner, the display apparatus 100 can display a control panel on the LCD 107, accept an operation input from the user through the use of the touch panel 121 adhered to the display screen of the LCD 107 and the coordinate detection section 122, form an operation signal corresponding to the accepted operation input and transmit the operation signal to the base apparatus 200.

The processing by the base apparatus 200, which receives the operation signal transmitted by radio from the display apparatus 100, is now described with reference to the flow chart of FIG. 6. This processing, illustrated in FIG. 6, is executed by the control section 230 of the base apparatus 200 after the base apparatus 200 is turned on. The base apparatus 200 supervises the output signal of the reception processing section 212 to determine when an operation signal from the display apparatus 100 is received (step S21). If no operation signal is received, then step S21 is repeated. If an operation signal is received, then the control section 230 of the base apparatus 200 determines whether the operation signal is intended for the base apparatus 200 (step S22). If the operation signal is for the base apparatus 200, then the control section 230 executes a process in accordance with the received operation signal (step S23). For example, controlling the tuner 202 to change the selected broadcast signal or changing the selector 206. The control section 230 repeats this process by returning to step S21. In this manner, the base apparatus 200 can be remotely controlled using the display apparatus 100.

On the other hand, if the operation signal is not for the base apparatus 200, then the control section 230 controls the remote control signal formation section 241 to form a remote control signal in accordance with the received operation signal from the display apparatus 100 (step S24). This remote control signal is supplied to the remote control signal transmission section 250 through the output terminal 242 and then transmitted as an infrared signal to the set-top box 300, as the external input apparatus (step S25). Consequently, the set-top box 300 can be remotely controlled through the base apparatus 200 using the display apparatus 100.

The processing of the set-top box 300 which receives a remote control signal of infrared rays transmitted from the remote control signal transmission section 250 of the base apparatus 200 is now described with reference to the flow chart of FIG. 7. The processing illustrated in FIG. 7 is executed by the control section 310 of the set-top box 300. Power is supplied to the set-top box 300 and the last selected channel is selected by the last channel memory function so that a video signal and an audio signal may be output. The control section 310 of the set-top box 300 waits at step S31 until it receives a remote control signal for the set-top box 300. When a remote control signal destined for the set-top box 300 is received, then the control section 310 forms a control signal in accordance with the remote control signal (step S32) and supplies the control signal to the pertaining components of the set-top box for execution (step S33). In this manner, the display apparatus 100 can be used to remotely control the base apparatus 200 and the display apparatus 100 can be used to remotely control the set-top box 300 through the base apparatus 200.

Figure 8:
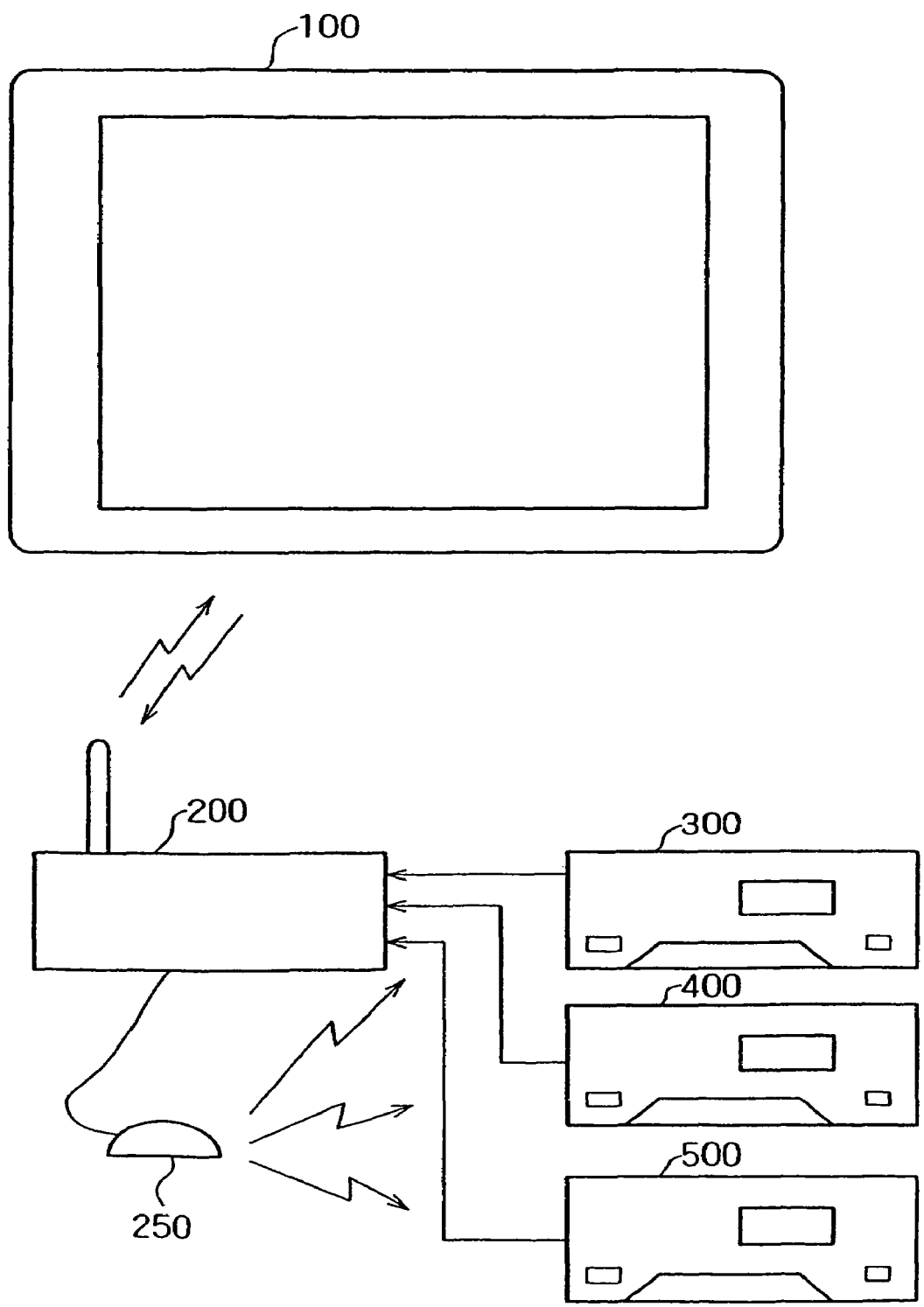
FIG. 8 is a system diagram showing a plurality of external input apparatuses connected to the base apparatus shown in FIG. 3.

Note that the present embodiment is described with the set-top box 300 being connected to the base apparatus 200. However, the present invention is not limited to this specific configuration. As described hereinabove, various input apparatuses such as a VTR, an integrated receiver decoder, and/or a DVD apparatus can be connected to the base apparatus 200 in place of the set-top box 300. Further, the base apparatus 200 may have a plurality of external input terminals, so that plural external input apparatuses may be connected to the base apparatus 200 as seen in FIG. 8. In this instance, the external input terminals are connected to the selector 206 of the base apparatus 200 shown in FIG. 3 so that one device can be selected at a time by using the selector 206. When a plurality of external input apparatuses are connected to the base apparatus 200, control panels corresponding to each of the external input apparatuses can be selectively displayed on the display screen of the display apparatus 100. FIGS. 9A to 9C illustrate example or control panel displays corresponding to a plurality of external input apparatus. More particularly, FIG. 9A shows the control panel CP for the set-top box 300. As described hereinabove, the control panel CP for the set-top box 300 includes a power supply on/off key, numeral keys, channel up/down keys and sound volume up/down keys. Similarly, FIG. 9B shows a control panel CP1 for a VTR. The control panel CP1 includes a power supply on/off key and various keys corresponding to operation keys for the VTR including a pause key, a fast forward key, a rewind key, a playback key, a stop key and a recording key. FIG. 9C shows a control panel CP2 for a DVD apparatus. The control panel CP2 includes a power supply on/off key and various keys corresponding to operation keys for the DVD apparatus including a pause key, a fast forward key, a rewind key, a playback key and a stop key.

In this instance, as seen in FIGS. 1 and 9A to 9C, a control panel is displayed in the right portion of the LCD 107 as viewed by the user, and when the user repetitively touches the touch panel in an area other than the control panel, the control panels corresponding to the base apparatus 200 and the external input apparatuses are displayed successively and sequentially.

More particularly, the display apparatus 100 displays the control panels sequentially as: 1) the control panel CP for the set-top box→2) the control panel for the base apparatus 200→3) the control panel CP1 or the VTR 400→4) the control panel CP2 for the DVD apparatus 500→5) erasure of the control panel→1) the control panel for the set-top box 300.

In this instance, as described hereinabove, the control panel for the base apparatus 200 includes a changeover key for operating the selector 206 to output a signal from the selected external input apparatus. Thereafter, the control panel for the external input apparatus is displayed to remotely control the external input apparatus through the display apparatus 100 and the base apparatus 200. In this manner, the control panel displayed on the LCD 107 along with the touch panel can be used to perform as a remote control. When the external input apparatus is a VTR or a DVD apparatus, the control panel can be used to control operation of the apparatus such as switching on/off of the power supply, pause, fast forwarding, rewinding, playback, stopping and recording. Remote control of the base apparatus 200 and the external input apparatus connected to the base apparatus 200 is not limited to those operations described above. For example, if the base apparatus 200 and/or the set-top box 300 are configured for bilingual audio operation, then a changeover key between a main audio and a sub audio may be provided on the control panel. Also, when the external input apparatus is a VTR or a DVD apparatus, a playback speed adjustment key may be provided on the control panel to adjust the playback speed. In this manner, various remote control operations can be performed through the control panels by providing operation keys corresponding to functions of the apparatus to be controlled.

Further, in order for a plurality of external input apparatus to be smoothly controlled, a number of remote control signal transmission sections may be connected to the base apparatus 200. These remote control signal transmission sections allow for the remote control signal to be transmitted in the proximity of each of the external input apparatus.

Also, it is possible to provide an electronic program guide display key on the control panel CP so that an electronic program guide is formed by the set-top box 300 5 and displayed on the LCD 107 of the display apparatus 100 through the base apparatus 200. Then, when a channel is selected through the electronic program guide, display regions corresponding to channels of the electronic program guide are sent to the display apparatus 100. When the user touches a portion of the touch panel 121 corresponding to a program displayed on the electronic program guide, the display apparatus 100 determines which program was selected. Then, the display apparatus 100 forms a channel selection operation signal for selecting the selected program and transmits the channel selection operation signal to the set-top box 300 through the base apparatus 200. Consequently, channel selection can be controlled using the electronic program guide.

Although, in the present embodiment, when the user repetitively touches the touch panel in an area other than the control panel, control panels corresponding to the base apparatus 200 and the external input apparatus are displayed successively and sequentially, the control panels need not be displayed in this manner. For example, changeover icons corresponding to various apparatus, which can be switchably used, may be provided on each control panel such that a control panel corresponding to an object apparatus may be displayed by operating the corresponding changeover icons.

Further, the base apparatus 200 is not limited to including just a tuner 202 and modem section 220. The base apparatus 200 may also function as a VTR or a DVD apparatus, or may function as a set-top box. The base apparatus 200 may also be configured to accept a signal from an external input apparatus and transmit the signal by radio without having a tuner 202 or a modem section 220.

Further, in the embodiment described above, the display apparatus 100 and the base apparatus 200 are connected to each other by radio communication, and the base apparatus 200 and an external input apparatus are connected to each other by a cable for transmitting an information signal and by infrared remote control signals. However, the connections between the display apparatus 100 and the base apparatus 200 and the connections between the base apparatus 200 and the external input apparatus are not limited to the specific examples. For example, the display apparatus 100 and the base apparatus 200 may be connected by a wire, and a remote control signal from the base apparatus 200 to the external output apparatus may be transmitted by a wire. Further, an information signal and a remote control signal may be transmitted by radio communication between the base apparatus 200 and the external input apparatus.

While a preferred embodiment of the present invention has been described using specific terms, such description is for illustrative purposes only, and it is to be understood that changes and variations may be made without departing from the spirit or scope of the following claims.

What is claimed is:

1. A bi-directional communication system comprising a display apparatus and a base apparatus:
   the display apparatus, including:
      information signal receiving means for wirelessly receiving an information signal from a website;
      a display screen for displaying an image corresponding to the website;
      operation display means for displaying an operation display on said display screen; said operation display comprising a plurality of display items corresponding to user selectable operations and a control panel representing a remote control of an external input apparatus to be connected to the base apparatus;
      a touch screen provided on said display screen for detecting a touched position on said display screen corresponding to a location at which a user touches said display screen;
      operation signal means for generating an operation signal corresponding to the display item displayed at the touched position on said display screen; and
      operation signal transmission means for wirelessly transmitting said operation signal; and
   the base apparatus, including:
      information signal transmission means for wirelessly transmitting said information signal to said display apparatus;
      operation signal receiving means for wirelessly receiving said operation signal from said display apparatus;

a communication line connection for transmitting and receiving communication signals through a communication line;

control signal means for generating a control signal when said operation signal corresponds to an operation of an external input apparatus; said control signal being the same as a signal from said remote control corresponding to said operation; and control signal transmission means for transmitting in the infrared said control signal to said external input apparatus; whereby said external input apparatus executes said operation, said base apparatus transmitting the received communication signal as the information signal to said display apparatus when the operation signal is an instruction for transmitting the received communication signal to the display apparatus; and said base apparatus transmitting a transmission information through the communication line when the operation signal from said display apparatus contains said transmission information for transmittal to an object party connected to said communication line.

* * * * *